June 9, 1936. C. M. JOHNSON 2,043,542
RUNNING GEAR FOR VEHICLES
Filed Sept. 21, 1935 3 Sheets-Sheet 2
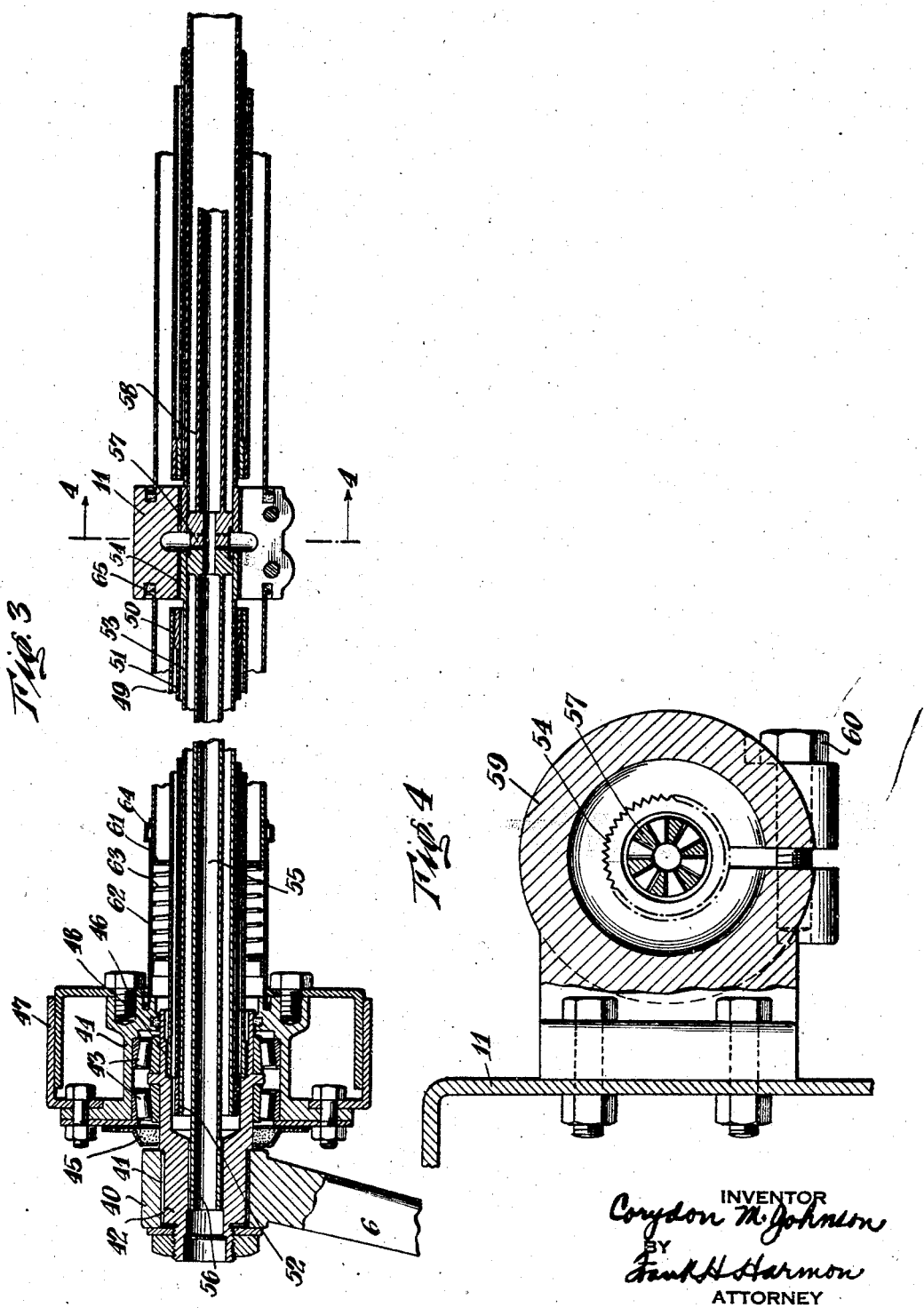

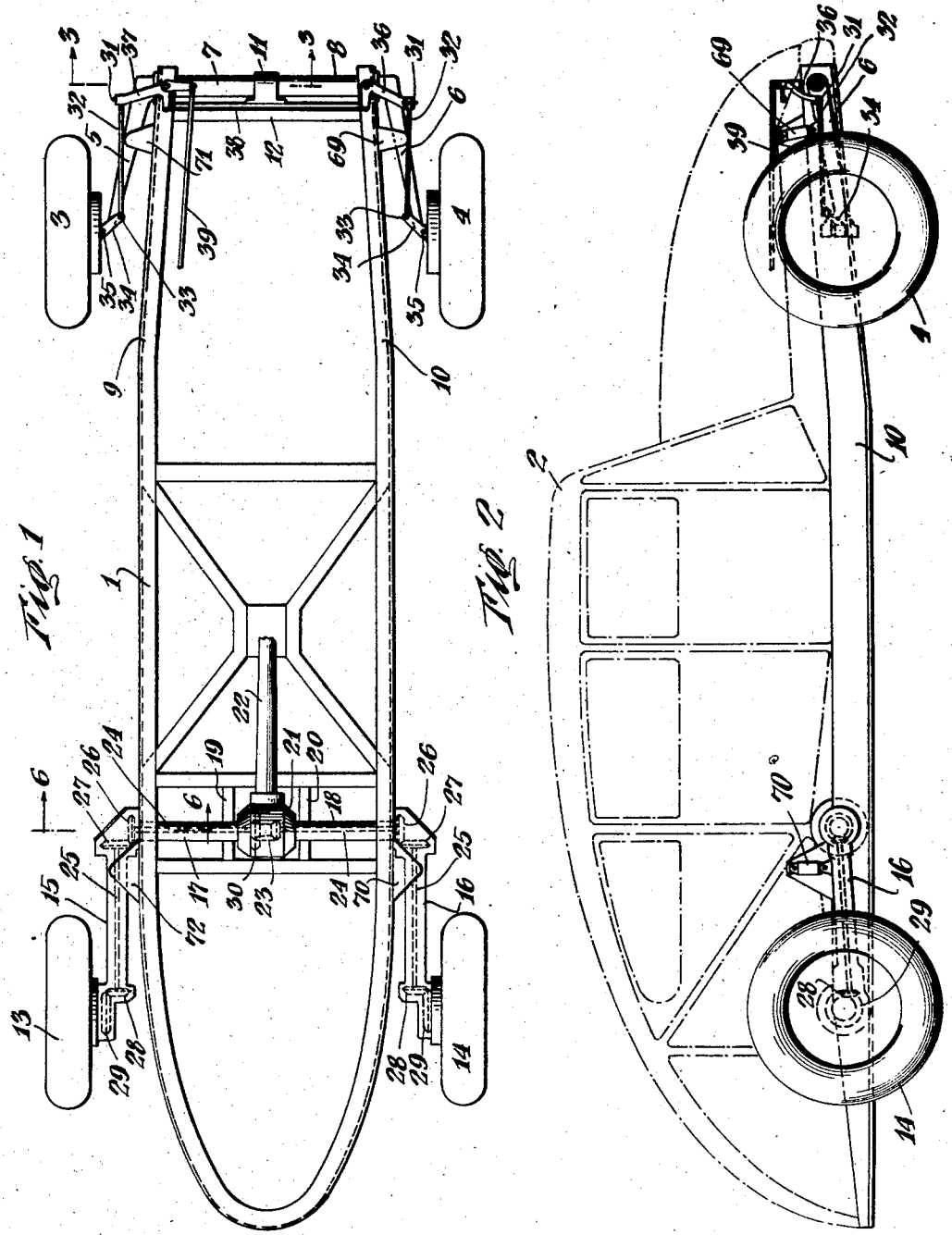

June 9, 1936.   C. M. JOHNSON   2,043,542
RUNNING GEAR FOR VEHICLES
Filed Sept. 21, 1935   3 Sheets-Sheet 3
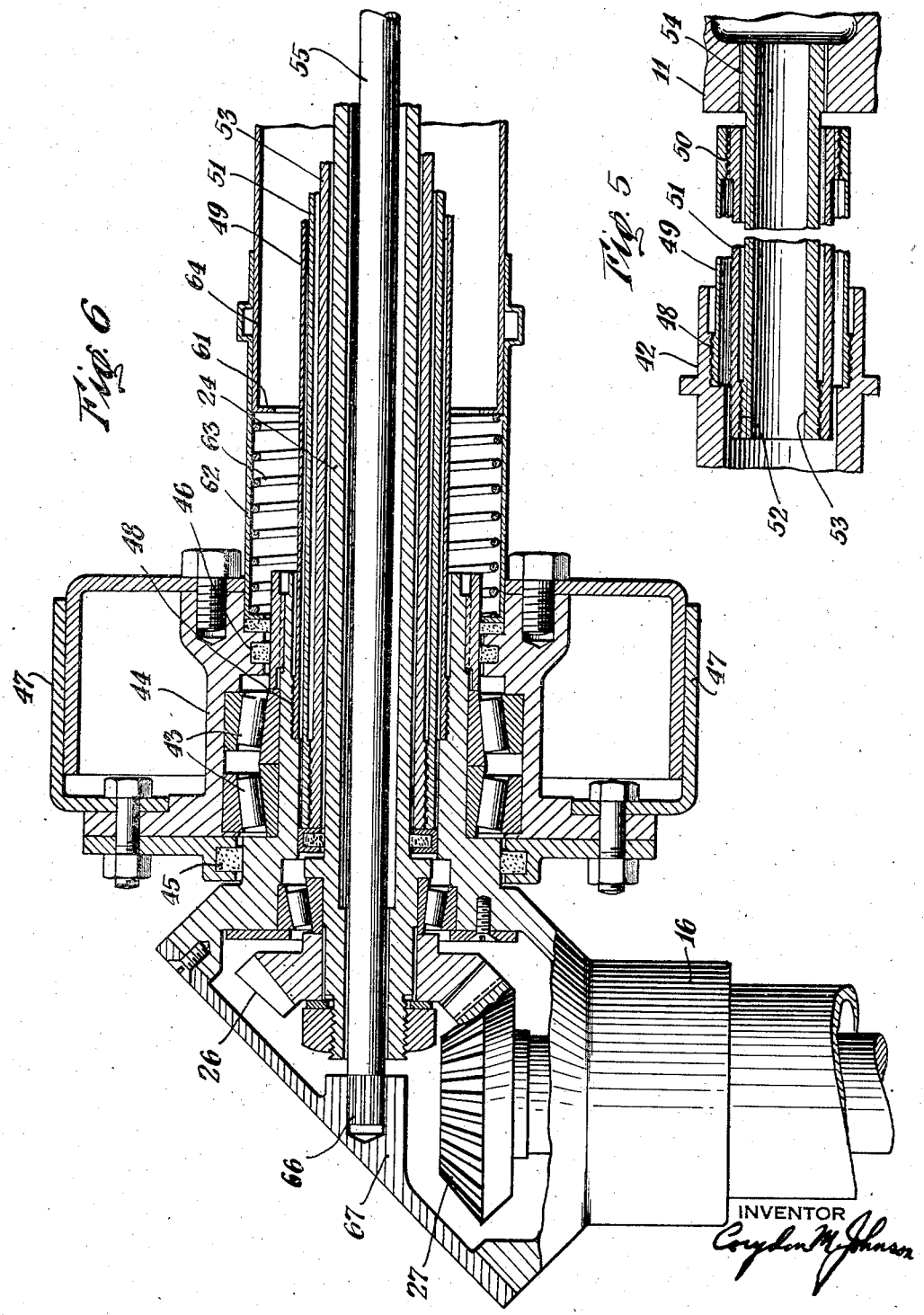
INVENTOR
Corydon M Johnson Patented June 9, 1936

2,043,542

UNITED STATES PATENT OFFICE 2,043,542

RUNNING GEAR FOR VEHICLES

Corydon M. Johnson, Freeport, N. Y.

Application September 21, 1935, Serial No. 41,588

14 Claims. (Cl. 180—73)

This invention relates in general to running gear for motor vehicles and more particularly to the general type of wheel suspension in which each wheel is mounted for independent bodily movement relative to the vehicle frame.

Heretofore in running gear of this general type, it has been the conventional practice to employ spring means of the leaf spring type which require frequent attention and lubrication in order to retain resiliency and prevent breakage and spring squeaks. Aside from the care and attention necessary in the use of leaf springs, such springs are inefficient in that they must be long and heavy to support great loads at the expense of resiliency or light in weight for resiliency at the expense of strength and durability.

It is therefore an object of my invention to provide an independent wheel suspension having the resilient and rugged characteristics necessary for all requirements and at the same time be of a minimum weight.

Another object is to provide such wheel suspension that they may constitute separate self-contained units which may be covered and protected from the elements and thus call for the minimum care and attention.

Another object is to provide such units as to also include positive and efficient resilient means to minimize sway of the vehicle when turning sharp corners or other like maneuvers.

A further object is to provide such units as may be applied to the driven as well as the non-driven vehicle wheels.

A further object is to provide such units comprised of concentrically arranged torsion tubes that are so resilient and so designed and proportioned that there will be maintained an equal stress as well as an equal angular deflection throughout all the tubes.

In carrying out my invention, I may employ in each unit a multiple torque tube assembly including a plurality of concentrically arranged torque tubes secured to each other for obtaining the resiliency from all at a reduction of overall dimensions. I may also efficiently use such an arrangement on the driven wheels as well as the non-driven wheels without interference or alteration of the conventional driving mechanism. Preferably I vary the wall thickness of two or more flexible concentrically arranged torsion tubes or otherwise vary their tensile strength or resistance to torsion so that the inner tube is relatively stronger and less susceptible to torsion than the intermediate tube or tubes and this is true of the latter tube or tubes with respect to the outer tube. The underlying idea is to so design the tubes that there will be maintained an equal stress as well as an equal and uniform angular deflection throughout the tubes. I may further incorporate in such units a torque tube sway eliminator for the vehicle so as to derive the benefits of efficient independent wheel suspension and sway elimination in substantially one unit.

With the foregoing and other objects in view, the invention consists in the combination of parts and in the details of construction hereinafter set forth in the following specification and appended claims, certain embodiments thereof being illustrated in the accompanying drawings, in which:

Figure 1 is a top plan view of an automobile chassis with my invention applied thereto, showing in dotted lines the differential and rear wheel drive;

Figure 2 is a side view of the chassis showing the body and certain parts of my invention in dotted lines;

Figure 3 is a view in section taken along line 3—3 of Figure 1;

Figure 4 is a view in section taken along line 4—4 of Figure 3;

Figure 5 is an enlarged partial view of that shown in Figure 3;

Figure 6 is a view in section taken along line 6—6 of Figure 1.

Referring more particularly to the drawings, the chassis and body may be of the form shown respectively at 1 and 2 in Figures 1 and 2. The front or non-driven wheels 3 and 4 are independently suspended and are carried by independent radius arms 5 and 6 which extend into independent torsion spring units 7 and 8 to the spring elements of which they are secured by means later to be described. These units 7 and 8 are supported by the side beams 9 and 10 by a common bracket 11 secured to the front beam 12 of the chassis.

Subsequently the same arrangement prevails with respect to the rear wheels 13 and 14 which are also independently suspended and carried by independent radius arms 15 and 16 which extend into independent torsion spring units 17 and 18 to the spring elements of which they are secured by means later to be described. These units 17 and 18 are supported by the side beams 9 and 10, beams 19 and 20 and the differential housing 21.

This arrangement of independent rear or driven wheel suspension is of such designed character as to call for the least modification of the present principle of drive from the drive shaft 22 to the differential gears 23 to and through the gears 26 27, 28, 29 and 30 and the shafts 24 and 25 to each rear wheel inasmuch as there occurs a differential action between the wheels whether one wheel bodily rotates relatively to the other or whether one radius arm moves relatively to the other or both.

Also, in connection with the front wheel suspension, the independent nature thereof does not interfere with the proper steering. This is brought about by providing a lateral pivot at 31, allowing rod 32 to thus pivot with respect to bell crank 36. Rod 32 is pivotally connected at 33 to arm 34 which is pivotally connected at 35 to the arm 6. A similar arrangement exists between bell crank 37 and wheel 3. Bell cranks 36 and 37 are connected by a tie rod 38 and the bell crank 37 may be suitably operated by rod 39 for steering both wheels despite the independent wheel suspension.

In Figures 3, 4 and 5 I have illustrated one preferred form of independent suspension for one of the front or non-driven wheels emphasizing the construction of the torsion spring unit therefor. In order to obtain maximum resiliency and ruggedness and minimum weight and overall dimensions, I prefer to employ a multiple torsion spring unit for each wheel.

The radius arm terminates in a collar 40 which is splined at 41 to a sleeve 42. This sleeve is provided with roller bearings 43 in a bearing housing 44 and provided with grease retainers 45 and 46, the bearing housing being carried by the car frame 47. The sleeve 42 is welded at 48 to a relatively thin outer tube 49 of the multiple tube torsion spring. The outer tube is welded at 50 to a relatively thicker intermediate tube 51 and the latter is welded at 52 to the relatively thicker inner tube 53 while the latter is splined at 54 to the bracket 11. While I have shown in Figures 3, 5 and 6 a multiple tube torsion spring as consisting of three tube springs of different thickness, it will be understood that more or less than three may be used if found desirable.

Exactly the same arrangement prevails with respect to each front wheel so that each wheel is suspended independently of the other and an adequate independent resiliency and stability is provided for each wheel to afford "knee" action.

In addition to "knee" action, I have incorporated in each unit a sway eliminator in its most simple form. This may comprise a sway resisting torque tube 55 splined to sleeve 42 at 56. This tube is removably connected to the adjacent end of a similar tube 58 extending from the radius arm of the other wheel by means of a dog coupling 57. In this connection the anchorage bracket 11 may include a split clamp 59 with an adjustment nut 60 for securing a tight hold on the spline connection between the inner tube 53 and the bracket 11 and its clamp 59.

This sway eliminator does not interfere with the independent wheel suspension or the "knee" action made possible thereby. In turning corners or in executing other maneuvers which would tend to disturb the even keel of the chassis the tendency of either side to become elevated with respect to the other will be counteracted by the opposing force set up in the sway eliminator tube which causes that elevating side to become lowered.

In order to overcome the necessity for constant care and attention in the matter of lubrication and rust prevention, I have provided each unit with an outer dust cover comprising a stationary shell 62, inside of which is arranged a sliding shell 61 which latter is urged by spring 63 into a recess 65 in the anchorage bracket 11.

To take care of this sliding action a grease retainer 64 may be provided. With this arrangement the unit may be packed with grease without danger of leakage and ingress of dirt or dust.

The construction of the units for the rear wheels is the same as those for the front wheels, with the exception that by reason of the centrally located differential the anchorage bracket is dispensed with. These units may include the dust cover and the three torsion tubes connected to each other and to the sleeve 42 in the same manner as described in connection with the front wheels. The inner tube 53 may be splined to the differential casing in the same manner as it is to the anchorage bracket.

The shaft 24 arranged concentrically within the torsion tubes may, as shown in Figure 6, be hollow. The sway eliminator for the rear wheels may take on a modified form from that described for the front wheels and may comprise a rod 55 splined at 66 to the casing of the unit at 67. This rod may extend through the differential and through the other unit on the other rear wheel and be anchored the same as shown at 66 and 67.

As a swaying tendency occurs the unit on the lower side receives a greater downward pressure while the pressure on the other unit is lessened. The rod 55, or tube if desired, being anchored in both units transmits this pressure to the upper side so as to equalize or tend to do so, with the result that the swaying action is counteracted. The same is true of the front wheel units, inasmuch as the torque tube is anchored to the radius arm and to the common anchorage bracket 11.

If it be found advisable, suitable conventional shock absorbing devices 69, 70, 71 and 72 may be arranged between the chassis and the corresponding radius arm, as shown in the drawings.

Thus it will be seen that I have provided wheel suspension units for each wheel so that the front and rear wheels may all be independently suspended and that I have made it possible to include in the unit a sway eliminating device. It will also be seen that by my arrangement the overall dimensions and the weight of the sway eliminator and the suspension device constituting the unit is greatly reduced as is the necessity for care and attention to its working parts.

I claim:

1. In an independent wheel suspension construction, a resilient element therefor comprised of three or more concentrically arranged torsion tubes having their respective adjacent ends connected together in series to form in effect a single tube, the intermost of which is of greatest relative wall thickness, the intermediate of which is of lesser wall thickness and the outermost of which is of least wall thickness.

2. In an independent wheel suspension construction, a resilient device therefor comprising a self-contained unit including a plurality of hollow torsion tubes concentrically arranged and having their respective ends connected together in series to form in effect a single tube, the inner tube or tubes being of greater wall thickness relatively to the tube or tubes exteriorly arranged thereof.

3. In an automotive vehicle having wheels, means for independently suspending each of said wheels, each of said wheels being provided with a radius arm, and a separate resilient device, comprising a plurality of hollow torsion tubes concentrically arranged and having their respective adjacent ends connected together in series to form in effect a single tube, the inner of said hollow torsion tubes being of such greater relative wall thickness than the tube arranged immediately exteriorly thereof as to provide a substantially constant section modulus throughout the length of said tubes, said device being connected to said radius arm and the vehicle chassis.

4. In an automotive vehicle having wheels, means for independently suspending each of said wheels, each of said wheels being provided with a radius arm, a resilient device connected to said radius arm and the vehicle chassis, said resilient device comprising a plurality of substantially concentrically arranged hollow torsion tubes having their respective ends connected in series to form in effect a single tube, the inner of said hollow torsion tubes being of such greater relative wall thickness than the tube arranged immediately exteriorly thereof as to provide a substantially constant section modulus throughout the length of said tubes, at least one of which tubes is anchored to the chassis and at least another of which is anchored to the radius arm.

5. In an automotive vehicle having a self-contained unit constituting means for independently mounting each of a transverse pair of wheels, said unit comprising a hollow torsion member for resiliently resisting vertical movement of its respective wheel and a second hollow torsion member connecting said pair of wheels for resiliently resisting sway of said vehicle, said torsion members being arranged substantially concentric with each other to constitute said self-contained unit.

6. In an automotive vehicle having non-driven wheels, a self-contained unit constituting means for independently mounting a pair of wheels of said vehicle, said unit comprising a plurality of substantially concentrically arranged hollow torsion tubes having their respective adjacent ends connected together in series to form in effect a single tube, a radius arm for each of said pair of wheels, at least one of said tubes being anchored to one of said radius arms and at least another being anchored to the frame of said vehicle, said unit also including and enclosing a sway resisting device in the form of a connection between the radius arm of one wheel with that of the other.

7. In an automotive vehicle having wheels, a self-contained unit constituting means for independently mounting a pair of wheels of said vehicle, said unit comprising a plurality of substantially concentrically arranged hollow torsion tubes having their respective adjacent ends connected together in series to form in effect a single tube, a radius arm for each of said pair of wheels, at least one of said tubes being anchored to one of said radius arms and at least one being anchored to the frame of said vehicle, said unit also including and enclosing a sway resisting device in the form of a connection between the radius arm of one wheel with that of the other, and a self-adjusting protective cover for housing said unit.

8. In an automotive vehicle having wheels, a self-contained unit constituting means for independently mounting said wheels, said unit comprising a plurality of substantially concentrically arranged hollow torsion tubes having their respective adjacent ends connected together in series to form in effect a single tube, a radius arm for at least one of said wheels, at least one of said tubes being anchored to said radius arm and at least one being anchored to the frame of said vehicle, and a dust-proof and leak-proof cover for said tubes, said cover being automatically adjustable for housing tubes of different lengths.

9. In an automotive vehicle having driven and non-driven wheels, a self-contained unit constituting means for independently mounting each of a pair of non-driven wheels, said unit comprising a plurality of substantially concentrically arranged hollow torsion tubes, a radius arm for each of said non-driven wheels, said unit also including and enclosing a sway resisting device in the form of a direct connection between the radius arm of one non-driven wheel with the radius arm of the other non-driven wheel.

10. In an automotive vehicle having a transverse pair of driven wheel and a differential therebetween, a unit constituting means for independently mounting each of said pair of wheels of said vehicle, said unit comprising a plurality of substantially concentrically arranged hollow torsion tubes having their respective adjacent ends connected together in series to form in effect a single tube and a driving connection between said differential and said driven wheels substantially concentrically arranged with respect to said tubes.

11. In an automotive vehicle having a transverse pair of driven wheels and a differential therebetween, a pair of self-contained units constituting means for independently mounting each of said pair of wheels of said vehicle, each of said units comprising a plurality of substantially concentrically arranged hollow torsion tubes having their respective adjacent ends connected together in series to form in effect a single tube, and a radius arm for each of said pair of wheels, at least one of said tubes being anchored to said radius arm and at least one being anchored to the frame of said vehicle, said units also including a sway resisting device in the form of a connection between the radius arm of one driven wheel with that of the other and substantially concentrically arranged with relation to said tubes and independent of any connection therewith, a driving connection between said differential and said driven wheels arranged substantially concentric with and independent of said tubes.

12. In an automotive vehicle having a transverse pair of driven wheels and a differential therebetween, a pair of self-contained units constituting means for independently mounting each wheel of said vehicle, each of said units comprising a hollow torsion member and a radius arm, said torsion member being anchored to said radius arm and to the frame of said vehicle for resiliently resisting vertical movement of each of said wheels independently, and a second hollow torsion member indirectly connecting said transverse pair of driven wheels and arranged substantially concentrically of and independently of said first mentioned torsion members for resiliently resisting sway of said vehicle, and a driving connection between said differential and said driven wheels also arranged substantially concentric with both said first and second mentioned torsion members.

13. In an automotive vehicle having wheels, means for independently suspending each of said wheels, each of said wheels being provided with a radius arm, a resilient device connected to said radius arm and the vehicle chassis, said resilient device comprising a plurality of substantially concentrically arranged hollow torsion tubes having their respective adjacent ends connected together in series to form in effect a single tube, at least one of which is anchored to the chassis and at least one of which is anchored to said radius arm, each of said tubes with the exception of said outer tube being of relatively greater wall thickness than the tube arranged immediately exteriorly thereof.

14. In an automotive vehicle having wheels, means for independently suspending each of said wheels, each of said wheels being provided with a radius arm, a resilient device connected to said radius arm and the vehicle chassis, said resilient device comprising a plurality of substantially concentrically arranged hollow torsion tubes having their respective adjacent ends connected together in series to form in effect a single tube, at least one of which is anchored to the chassis and at least one of which is anchored to said radius arm, said tubes having different wall thickness whereby an equal stress and uniform angular deflection is maintained throughout all of said tubes when one is subjected to torsion.

CORYDON M. JOHNSON.